United States Patent
Oroskar et al.

(10) Patent No.: US 8,059,542 B1
(45) Date of Patent: Nov. 15, 2011

(54) REVERSE NOISE RISE BASED PAYLOAD THRESHOLD DETERMINATION FOR AUXILIARY PILOT TRIGGER

(75) Inventors: Siddharth S. Oroskar, Overland Park, KS (US); Debasish Sarkar, Irvine, CA (US); Sachin R. Vargantwar, Overland Park, KS (US); Hemanth Pawar, Herndon, VA (US); Shilpa Kowdley Srinivas, Herndon, VA (US); Badri Subramanyan, Overland Park, KS (US); Piyush Upadhyay, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 201 days.

(21) Appl. No.: 12/478,827

(22) Filed: Jun. 5, 2009

(51) Int. Cl.
*H04L 1/00* (2006.01)
*H04L 12/26* (2006.01)
*H04W 4/00* (2009.01)
*H04J 3/16* (2006.01)
*H04J 3/22* (2006.01)

(52) U.S. Cl. ........ 370/235; 370/236; 370/328; 370/331; 370/470

(58) Field of Classification Search .......... 370/235, 370/236, 320, 328, 331, 335, 342, 470
See application file for complete search history.

(56) References Cited

U.S. PATENT DOCUMENTS

| | | | |
|---|---|---|---|
| 2004/0160914 A1* | 8/2004 | Sarkar | 370/329 |
| 2004/0218559 A1* | 11/2004 | Kim et al. | 370/318 |
| 2004/0246924 A1* | 12/2004 | Lundby et al. | 370/332 |

OTHER PUBLICATIONS

Unpublished U.S. Appl. No. 12/243,070 entitled "Variable Auxiliary Pilot Trigger and Performance" filed Oct. 1, 2008 in the name of Debasish Sarkar et al.
Unpublished U.S. Appl. No. 12/432,311 entitled "Dynamic Payload-Size Threshold for Triggering an Auxiliary Pilot" filed Apr. 29, 2009 in the name of Sachin Vargantwar et al.
Unpublished U.S. Appl. No. 12/569,120 entitled "Enhanced Reverse-Link Auxiliary Pilot Trigger" filed Sep. 29, 2009 in the name of Hemanth Pawar et al.
Unpublished U.S. Appl. No. 12/634,818 entitled "Auxiliary Pilot Trigger Based on Latency" filed Dec. 10, 2009 in the name of Debasish Sarkar et al.

* cited by examiner

*Primary Examiner* — Ronald Abelson

(57) ABSTRACT

A method and system is disclosed for dynamically adapting operation of an auxiliary pilot according to reverse noise. An access terminal in a wireless communication system that includes a base station may operate in a first state in which the access terminal transmits a primary pilot signal on an air interface communication link to the base station, and also transmits an auxiliary pilot signal on the air interface communication link to the base station concurrently with transmission of the primary pilot signal. While operating in the first state, responsive at least to receiving a noise-level message from the base station indicating excessive reverse-link noise, the access terminal may transition to a second state in which it ceases to transmit the auxiliary pilot signal but continues to transmit the primary pilot signal.

30 Claims, 5 Drawing Sheets

REVERSE NOISE RISE BASED PAYLOAD THRESHOLD DETERMINATION FOR AUXILIARY PILOT TRIGGER

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Data on either link are encoded by the sender and decoded by the receiver. To facilitate decoding, the sender also transmits a beacon or "pilot" signal that, among other functions, provides the receiver with a timing reference for other signals transmitted by the sender. Thus, an AT transmits a pilot signal on its reverse link that enables the receiving base station to decode other signals sent by the AT. Under certain conditions, an AT can transmit two pilots on its reverse link: a "primary" pilot and an "auxiliary" pilot, whereby the auxiliary pilot effectively boosts the power of the primary pilot, so as to enhance the precision and reliability of the base station's timing reference for the AT.

The access terminal switches its auxiliary pilot on and off in response to the size of the data payloads that the AT transmits in link-layer packets to its serving base station. More specifically, the size of a data payload corresponds to a volume of data transmitted per unit time, such that the larger the payload size, the higher the density of information per payload, and vice versa. As the payload size (and the density of information) increases, the precision and reliability of the base station's timing reference becomes more important to the base station's ability to correctly decode received data packets. In order to ensure a precise and reliable timing reference, the AT uses a threshold payload size to determine whether or not to trigger its auxiliary pilot, turning the auxiliary pilot on when the payloads of transmitted packets exceed the threshold size and turning it off when they are below threshold size.

In conventional operation, the threshold payload size is set in a system parameter that is disseminated to all AT operating in the wireless communication system. The value of the threshold payload size parameter remains relatively fixed, possibly being adjusted only from time to time by the system operator. Hence, all ATs operate according to the same threshold value, regardless of the possibly differing RF conditions on the respective reverse links of the access terminal.

While transmission of an auxiliary pilot helps enhance the reliability of decoding of an AT's reverse-link signals by the base station, the aggregate effect of multiple ATs all transmitting their auxiliary pilots also increases noise and interference received by the base station on the reverse links, an effect which tends to degrade the reliability of decoding. At the same time, application of a single threshold value for all ATs increases the likelihood that at least some ATs will unnecessarily employ their auxiliary pilots (i.e., when the base station can reliably decode their signals without their auxiliary pilots), thereby unnecessarily boosting their contributions to reverse-link noise and interference.

In practice, the base station does monitor the aggregate noise and interference resulting from the combined transmissions of active ATs, and periodically broadcasts a noise-level message indicating the reverse-link noise level measured by the base station. More specifically, the base station broadcasts a message to all ATs indicating whether or not the measured noise level exceeds a threshold noise level. If the threshold is exceeded, each AT reduces its power for data transmissions in order to help reduce the reverse-link noise. However, the reduced data-transmission power can also reduce the data rate that can be achieved by the ATs, and consequently reduce overall system throughput as well. Since at least some of the reverse-link noise may result from ATs that are employing (transmitting) their auxiliary pilots, even when some of those ATs don't need to be using their auxiliary pilots, it would be advantageous for ATs to disable or deactivate their auxiliary pilots in response to receiving a noise-level message broadcast instead of reducing their data-transmission power. In so doing, the ATs could advantageously maintain their data-transmission power level (and the supported data transmission rates), while still helping to reduce the reverse-link noise and interference. Accordingly, embodiments of the present invention advantageously provide dynamic adaptation of auxiliary pilot operation in an access terminal in response to reverse-link noise and interference as measured by the base station.

Hence in one respect, various embodiments of the present invention provide, in an access terminal operating in a wireless communication system that includes a base station, a method comprising: operating in a first state in which the access terminal transmits a primary beacon signal on an air interface communication link to the base station, and also transmits a secondary beacon signal on the air interface communication link to the base station concurrently with transmission of the primary beacon signal; and while operating in the first state, responsive at least to receiving a noise-level message from the base station, the noise-level message carrying an indication of a measurement by the base station of aggregate transmission noise received at the base station from a plurality of access terminals including the access terminal, transitioning to a second state in which the access terminal ceases to transmit the secondary beacon signal and continues to transmit the primary beacon signal.

In another respect, various embodiments of the present invention provide, in an access terminal operating in a wireless communication system that includes a base station, a method comprising: operating in a first state in which (i) the access terminal transmits a primary beacon signal on an air interface communication link to the base station, and, (ii) upon occurrence of a first condition of the access terminal transmitting data packets having sizes larger than a threshold packet size, the access terminal activates and transmits a secondary beacon signal on the air interface communication link to the base station concurrently with transmission of the primary beacon signal; and while operating in the first state, responsive to receiving a noise-level message from the base station, the noise-level message carrying an indication of a measurement by the base station of aggregate transmission noise received at the base station from a plurality of access terminals including the access terminal, disabling transmission of the secondary beacon signal.

In yet another respect, various embodiments of the present invention provide an access terminal configured for operating in wireless communication system, the access terminal comprising: means for operating in a first state in which (i) the access terminal transmits a primary beacon signal on an air interface communication link to a base station, and, (ii) upon occurrence of a first condition of the access terminal transmitting data packets having sizes larger than a threshold packet size, the access terminal activates and transmits a secondary beacon signal on the air interface communication link to the base station concurrently with transmission of the primary beacon signal; means for receiving a noise-level message from the base station while operating in the first state, the noise-level message carrying an indication of a measurement by the base station of aggregate transmission noise received at the base station from a plurality of access terminals including the access terminal; and means for disabling transmission of the secondary beacon signal in response to receiving the noise-level message.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
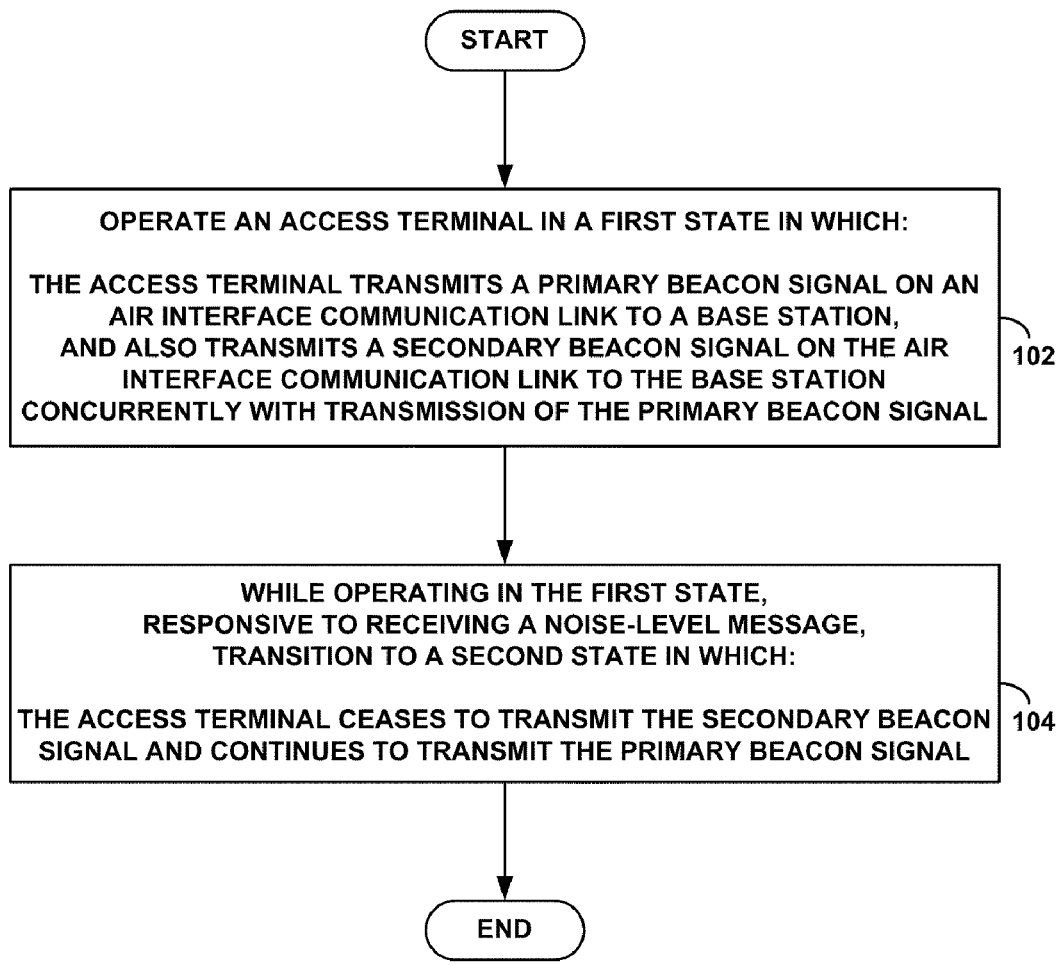
FIG. 1 is a flowchart illustrating an example embodiment of dynamic adaptation of auxiliary pilot operation in response to reverse-link noise.

FIG. 1 is a flowchart illustrating an example embodiment of dynamic adaptation of auxiliary pilot operation in response to reverse-link noise. By way of example, the steps of the flowchart could be implemented in an access terminal in a wireless communication system that includes a base station (among other elements of a RAN), and that operates according to a CDMA family of protocols. At step 102, the access terminal operates in a first state in which it transmits a primary beacon signal on an air interface communication link to the base station, and also transmits a secondary beacon signal on the air interface communication link to the base station concurrently with transmission of the primary beacon signal. In accordance with the example embodiment, the first state could be an "active state" in which the access terminal is engaged in a communication session (e.g. an EVDO communication session) or call via the base station. In such an active state, the AT's behavior as described in connection with step 102 helps maintain robustness of operation.

For an AT and base station operating according to EVDO, Rev. A, for instance, the primary beacon signal could be the primary pilot transmitted by the AT on its reverse link to the base station. The pilot signal of an AT is used by the AT's serving base station, among other purposes, to establish and maintain a timing reference for the AT, which then facilitates decoding by the base station of other signals sent by the AT on its reverse link. In accordance with the present example embodiment, the secondary beacon signal could be an auxiliary pilot. The auxiliary pilot is identical to the primary pilot, except that it is transmitted at a lower power level. Transmission of the auxiliary pilot therefore effectively boosts the power of the primary pilot as received by the base station. In so doing, the precision and reliability of base station's timing reference for the AT is enhanced, thereby enhancing the reliability of decoding of the AT's reverse-link signals. In practice, the power level of each of the primary and auxiliary pilot is specified as a gain level, x, according to the relation x dBm=$10 \log_{10}(P/1 \text{ mW})$, where P is the power in mW (milliwatts). However, other power units could be specified.

In further accordance with the example embodiment, operating in the first state could comprise transmitting data packets having sizes larger than a threshold size. In particular, the AT's transmission of the secondary beacon signal (or auxiliary pilot) could be conditioned on the access terminal transmitting packets having sizes larger than the threshold packet size, or more specifically on the access terminal transmitting packets having a payload sizes larger than a threshold payload size. In an EVDO communication (and under other CDMA-related protocols), the payload size on the reverse link corresponds to an amount of data transmitted per unit time (e.g., bits per second). The higher the amount of data per unit time (i.e., the larger the payload size), the more important the need for a precise and reliable timing reference at the base station. Hence, transmitting the auxiliary pilot for payload sizes exceeding the threshold size helps ensure that the base station will have a precise and reliable timing reference when it needs it. In a wireless communication system compliant with EVDO, Rev. A, the threshold packet size corresponds to a value of a system parameter dubbed "AuxiliaryPilotChannelMinPayload." Accordingly, the threshold condition could be based on a comparison by the access terminal of payload sizes of transmitted data packets to AuxiliaryPilotChannelMinPayload.

At step 104, while operating in the first state, upon receiving a noise-level message from the base station, the AT transitions to a second state in which the access terminal ceases to transmit the secondary beacon signal and continues to transmit the primary beacon signal. In accordance with the example embodiment, the noise-level message received by the AT carries an indication of a measurement by the base station of aggregate transmission noise received at the base station from a plurality of access terminals including the AT. Conventionally, the sum total (aggregate) of power received at any instant by a base station from the ATs in a given cell or sector (or other form of coverage area) is referred to as the "reverse noise" in that cell or sector. In practice, a base station (or a BTS) engaged in EVDO communications will periodically measure the reverse noise, and use the measurement to compute a differential noise metric referred to as the "reverse noise rise" ("RNR"). Specifically the base station computes the RNR as the difference between (i) the reverse noise that the base station is currently detecting and (ii) a baseline level of reverse noise, determined during a preconfigured "silent" interval. As such, the RNR determines how far the reverse noise has increased above that baseline, and provides a measure of load on the reverse links in the cell or sector. In accordance with the example embodiment, the noise-level message could carry an indication of the most-recently computed RNR.

One form of RNR indicator could be based on a threshold RNR level maintained by the base station or RAN. More specifically, under EVDO (and other CDMA-related protocols), the base station broadcasts a "reverse activity bit" that indicates whether or not the most recent RNR exceeds the threshold RNR value, and each AT served by the base station receives the RAB broadcast. If the RNR exceeds the threshold, then the RAB is set to one; this condition is a referred to as RAB "set." If the RNR is smaller than the threshold, then the RAB is set to zero; this condition is referred to as RAB "clear." For the purposes of the discussion herein, the term "RAB-set broadcast" shall refer to a RAB broadcast in which the RAB is set to one. Similarly, the term "RAB-clear broadcast" shall refer to a RAB broadcast in which the RAB is set to zero.

Under conventional operation, the RAB is used to control the fraction of each AT's transmission power that is devoted to data transmission. This fraction is referred to as the "traffic-to-pilot" ("T2P") power ratio. Responsive to receiving a RAB that is set (i.e., set to one), each AT will reduce its T2P power. Upon receiving a RAB that is clear (i.e., set to zero), each AT will leave its T2P power ratio unchanged. Since reducing an AT's T2P power ratio reduces the power available for transmitting data traffic, reducing T2P also likely reduces the AT's achievable data rate. Moreover, since the RAB is broadcast to all ATs on a cell or sector basis, the net effect of the ATs reducing their T2P powers, in addition to helping reduce the RNR, is to potentially reduce overall system throughput of data transmissions.

In accordance with the example embodiment, an AT that, while operating in the first state, receives an RAB set to one will responsively transition to the second state (as specified at step 104), instead of reducing its T2P power ratio. In the second state, the AT will cease transmitting its auxiliary pilot, but continue to transmit its primary pilot. Consequently, the AT may advantageously reduce its contribution to reverse noise while likely maintaining (or not substantially reducing) its current data transmission rate. Once more, since the RAB is broadcast, all ATs operating in the first state will responsively transition to the second state, and each will therefore cease transmitting its auxiliary pilot. Thus, a reduction in RNR may be achieved while advantageously maintaining (or nearly maintaining) overall system throughput.

As a further aspect of the example embodiment, an AT that, while operating in the second state, receives an RAB set to one will then reduce its T2P power in accordance with conventional operation. Such behavior accounts for the possibility that the collective response of a plurality of ATs transitioning from the first operational state to the second operational state does not sufficiently reduce the RNR enough to clear the RAB. Consequently, further reverse noise reduction is necessary. Therefore, each AT operating in the second state will reduce its T2P power in response to continued broadcasts of RABs set to one, thereby advantageously achieving reduced RNR on the reverse links to the base station. Nevertheless, by attempting to reduce the RNR by first ceasing to transmit auxiliary pilots, the system may achieve reduced RNR without necessarily reducing overall system throughput, thus providing a "performance safety net" for individual ATs as well as for the entire system.

In further accordance with the example embodiment, an AT that, while operating in the second state, receives an updated noise-level message from the base station will transition to the first state. More specifically, if the updated noise-level message indicates that reverse-link noise in a cell or sector (or other form of coverage area) has been adequately reduced (i.e., as a result of ATs in the coverage area), it may then be appropriate or permissible for access terminals in the cell or sector to begin conventional usage of their auxiliary pilots again. In keeping with the example embodiment, the updated noise-level message could be a RAB-clear broadcast. Transition from the second state to the first state could further comprise requiring an AT receiving a particular number of RAB-clear broadcasts while operating in the second state. Such a requirement could ensure that reduction of RNR is stable.

An alternative or additional form of RNR indicator could be the actual RNR value itself In this case, the noise-level message could still be broadcast to all ATs within the base station's cell or sector. However, each AT could individually determine if the RNR received from the base station exceeds an RNR threshold maintained by the AT. For example, each AT could maintain an AT-specific RNR threshold value in its memory (e.g., solid state, computer readable memory), and could compare the received RNR value with the locally-stored threshold RNR value. If the threshold is exceed, then the AT could transition to the second state, as described above. This alternative form of RNR indicator could allow different ATs that receive the same RNR broadcast from the base station to behave differently, according to each AT's stored RNR threshold value. Such an approach could advantageously allow different grades or tiers of service to be assigned to different ATs (and correspondingly to users/subscribers associated with the ATs). Thus, an AT with a larger RNR threshold would be able to remain in the first state (with it auxiliary pilot on) for a longer time than an AT with a smaller RNR threshold. Additionally, an AT that, while operating in the second state, receives an RNR broadcast with an RNR value below the AT's local RNR threshold could then transition to the first state. Again, different ATs could transition to the first state at different received RNR values.

As described above, transmission of the auxiliary pilot may be triggered when the AT transmits data packets larger than a threshold size, and in particular when the AT transmits data packets with payloads larger than AuxiliaryPilotChannelMinPayload. Conversely, in conventional operation, an AT that is transmitting its auxiliary pilot will cease transmitting the auxiliary pilot in response to transmitting data packets with payloads smaller than AuxiliaryPilotChannelMinPayload. Thus, in accordance with the example embodiment, then, transitioning from the first state to the second state could comprise the AT increasing the threshold packet size beyond the sizes of the data packets that it is transmitting, responsive to the AT receiving the noise-level message. The AT could then determine that it is not transmitting data packets larger than the threshold packet size, and responsively cease transmitting its auxiliary pilot. In so doing, the AT would transition from the first state to the second state.

In further accordance with the example embodiment, taking the threshold packet size to correspond to a value of AuxiliaryPilotChannelMinPayload, increasing the data packet size could then comprise increasing the value of AuxiliaryPilotChannelMinPayload. For instance, the AT could maintain a table of values of AuxiliaryPilotChannelMinPayload, and responsive to receiving a noise-level message containing an indication of RNR, the AT could choose an increased value of AuxiliaryPilotChannelMinPayload, such that the increased value is larger than the payload sizes of the data packets currently being transmitted by the AT. The AT would then recognize this condition and cease transmitting its auxiliary pilot. As described above, the RNR indicator could be a RAB set to one or an actual RNR value, and the actions of the AT with regard to increasing AuxiliaryPilotChannelMinPayload could be taken in accordance with receipt of the RNR indicator in the noise-level message. Note that in practice, the system typically specifies a maximum allowed size for AuxiliaryPilotChannelMinPayload, and the value selected or set by the AT would not exceed this maximum.

Note that once the AT transitions to the second state based on increasing the threshold packet size as described above, it is possible that the AT may begin to again transmit data packets with sizes that exceed the increased threshold size (now the current threshold size). Although not indicated in FIG. 1, in further accordance with the example embodiment, the AT could transition back to the first state in this case.

In an alternative embodiment, the AT may transition from the first state to the second state by simply ceasing to transmit it auxiliary pilot, without adjusting the threshold packet size. In this case, the AT would continue to transmit data packets with sizes in excess of the threshold even while ceasing to transmit its auxiliary pilot. Again, if cessation of auxiliary pilot transmissions by ATs in a coverage area does not sufficiently reduce RNR, the ATs could then reduce their T2P power ratios in response to further RAB-set broadcasts. This approach would effectively disable auxiliary pilot transmission even under conditions in which the auxiliary pilot is conventionally employed. While the base station's ability to decode reverse-link signals may be diminished to some extent as a result, the conventional application of just a single threshold packet size to control auxiliary pilot operation can result in unnecessary auxiliary pilot use by some ATs, as further described below. Thus, disabling the auxiliary pilot as a first attempt to reduce RNR advantageously allows the system to try to mitigate reverse-link loading without substantially reducing data throughput. Reverting to conventional methods of RNR reduction (i.e., reduction of T2P power) as a fallback if disabling auxiliary pilots does not achieve the requisite reduction ensures proper system performance. As with the embodiment described above, the threshold packet size in the alternative embodiment could correspond to AuxiliaryPilotChannelMinPayload.

In the discussion of FIG. 1, as well as in other discussions and explanations herein, the terms "first" and "second" as applied to "states," "determinations," "conditions," and the like, are used as identifying labels, and not meant to imply any numerical ordering (although a numerical ordering is not necessarily excluded).

It will also be appreciated that the steps of FIG. 1 are shown by way of example, and that additional and/or alternative steps or alternative ordering of steps could be carried out and still remain within the scope and spirit of the present invention.

In an alternative description of the example embodiment illustrated in FIG. 1, an access terminal could operate in a first state in which (i) the access terminal transmits a primary beacon signal on an air interface communication link to the base station, and, (ii) upon occurrence of a first condition of the access terminal transmitting data packets having sizes larger than a threshold packet size, the access terminal activates and transmits a secondary beacon signal on the air interface communication link to the base station concurrently with transmission of the primary beacon signal. Then, while operating in the first state, responsive to receiving a noise-level message from the base station, the access terminal could disable transmission of the secondary beacon signal. The primary and secondary beacon signals are again taken to be primary and auxiliary pilots. And once more, the noise-level message the noise-level message carries an indication of a measurement by the base station of aggregate transmission noise received at the base station from a plurality of access terminals including the access terminal and could be, by way of example, an RNR indicator such as a RAB-set broadcast. With this description, the first state includes operation both after occurrence of the first condition, and thus while the AT is already transmitting its auxiliary pilot, as well as prior to occurrence of the first condition, and thus prior to activation and transmission of the AT's auxiliary pilot. In other words, operation in the first state includes characterization of how the AT behaves in response to occurrence of the first condition. As such, operation before and after occurrence of the first condition is incorporated in the first operational state.

Accordingly, disabling transmission of the auxiliary pilot could comprise the AT, while already transmitting its auxiliary pilot, transitioning to a second state in which the AT ceases to transmit its auxiliary pilot while continuing to transmit the primary pilot. Disabling transmission of the auxiliary pilot could also comprise the AT, prior to activating and transmitting its auxiliary pilot, transitioning to a second state in which the AT does not activate or transmit its auxiliary pilot upon occurrence of the first condition. In either case, occurrence of a second condition of the AT transmitting data packets having sizes no larger than the threshold packet size could act as a trigger to cause the AT to turn off its auxiliary pilot (if the auxiliary pilot is on when the second condition occurs). Thus, with occurrence of the second condition while the AT is operating in the first state, disabling transmission of the auxiliary pilot could comprise increasing the threshold packet size so as to prevent transmission of the auxiliary pilot. Preventing transmission of the auxiliary pilot could then include turning off the auxiliary pilot if it is already on, or increasing the threshold size sufficiently so as to make triggering the auxiliary pilot on unlikely. As in the previous description, the threshold packet size could be threshold payload size, and more specifically could correspond to AuxiliaryPilotChannelMinPayload.

Figure 2:
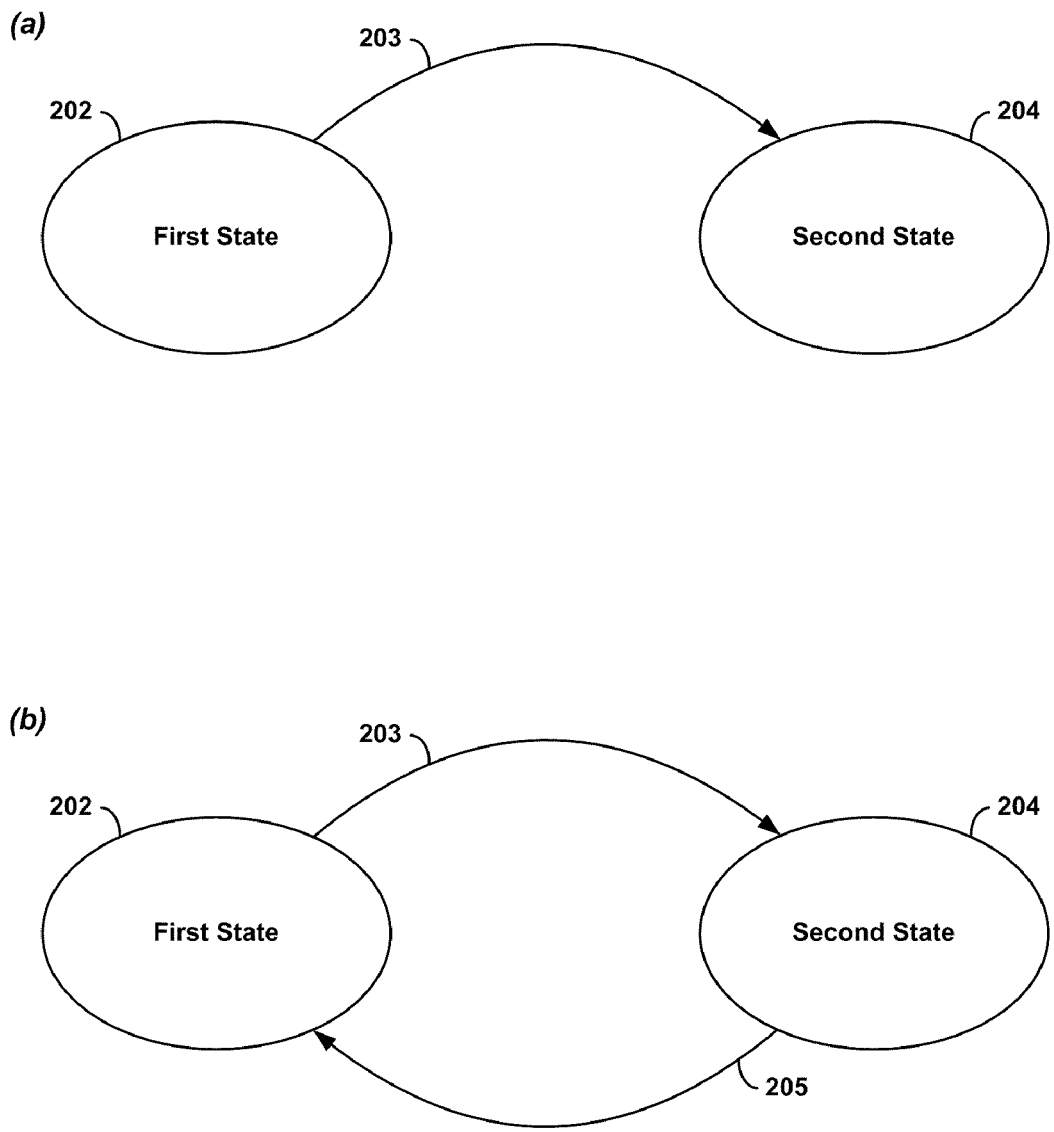
FIG. 2 is a state diagram illustrating an example embodiment of dynamic adaptation of auxiliary pilot operation in response to reverse-link noise.

FIG. 2 provides a simple illustration of the first and second states and the transitions between them. In panel (a) at the top, an access terminal is operating is the first state 202, wherein operation in the first state could be characterized by either of the two descriptions above. Upon receiving a noise-level message from the base station, the access terminal makes a transition 203 to the second state 204. As described above, the noise-level message can be one or another form of RNR indicator, such as a RAB-set broadcast or an actual RNR value. Operation in the second state is characterized by the AT disabling operation of its auxiliary pilot, wherein disabling can take on one or more forms, as described above. The bottom panel (b) of FIG. 2 again includes the first state 202, the second state 202, and transition 203 from the first to the second state, but also includes a transition 205 from the second back to the first state. In accordance with the example embodiment discussed above, the transition 205 back to the first state could comprise the AT receiving an updated noise-level, such as a RAB-clear broadcast, from the base station.

The transition 205 could also result from the AT transmitting packets with sizes larger than the threshold packet size while operating in the second state.

Figure 3:
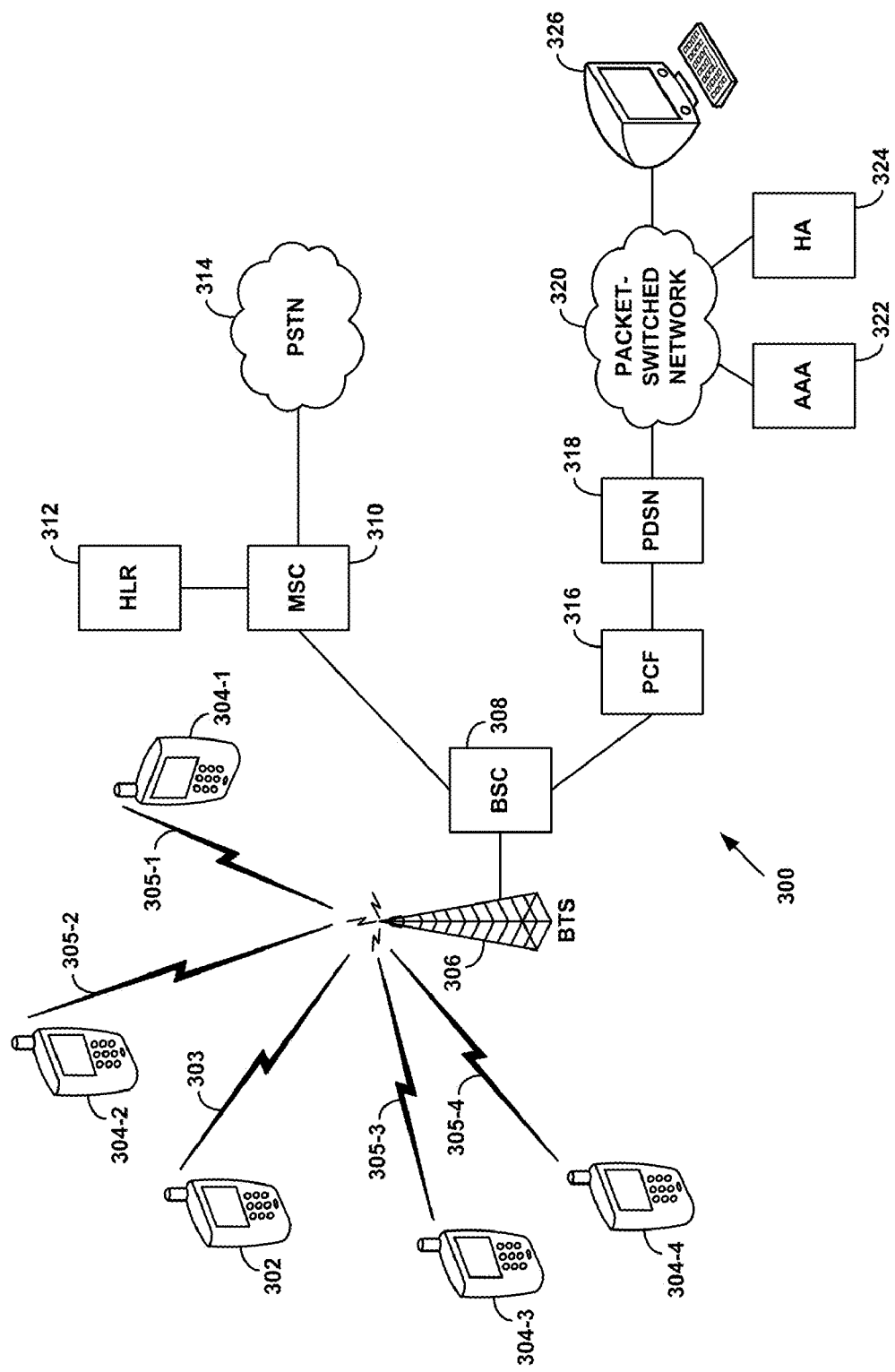
FIG. 3 is a simplified block diagram of a wireless communication system in which an example embodiment of dynamic adaptation of auxiliary pilot operation in response to reverse-link noise can be employed.

FIG. 3 shows a simplified block diagram of a wireless communication system 300 in which an example embodiment of dynamic adaptation of auxiliary pilot operation in response to reverse-link noise can be employed. Access terminal AT 302 communicates over an air interface 303 with a BTS 306, which is then coupled or integrated with a BSC 308. Transmissions over air interface 303 from BTS 306 to AT 302 represent the forward link to the access terminal (also referred to herein alternatively as the forward link from the base station, and as "the AT's forward link"). Transmissions over interface 303 from AT 302 to BTS 306 represent the "reverse link" (also referred to herein as "the AT's reverse link"). Four other access terminals, AT 304-1, 304-2, 304-3, and 304-4, are also depicted in FIG. 3. As indicated, they communicate with BTS 306 over air interfaces 305-1, 305-2, 305-3, and 305-4, respectively. Each of these air interfaces is operationally similar to air interface 303, each representing at least a forward and reverse link. It will be appreciated that this arrangement is for purposes of illustration.

BSC 308 is connected to MSC 310, which acts to control assignment of air traffic channels (e.g., over air interfaces 303, 305-1, 305-2, 305-3, and 305-4), and provides access to wireless circuit-switched services such as circuit-voice and circuit-data (e.g., modem-based packet data) service. As represented by its connection to PSTN 314, MSC 310 is also coupled with one or more other MSCs or other telephony circuit switches in the operator's (or in a different operator's) network, thereby supporting user mobility across MSC regions, and local and long-distance landline telephone services. Also connected to MSC 310 is home location register (HLR) 312, which supports mobility-related aspects of subscriber services, including dynamic tracking of subscriber registration location and verification of service privileges.

As shown, BSC 308 is also connected with a PDSN 318 by way of packet control function (PCF) 316. PDSN 318 in turn provides connectivity with a packet-switched network 320, such as the Internet and/or a wireless carrier's private core packet-network. Sitting as nodes on network 320 are, by way of example, an authentication, authorization, and accounting (AAA) server 322, a mobile-IP home agent (HA) 324, and a remote computer 326. After acquiring an air traffic channel over its air interface, an access terminal (e.g., AT 302) may send a request to PDSN 318 for a connection in the packet data network. Then, following authentication of the access terminal by AAA server 320, the access terminal may be assigned an IP address by the PDSN or by HA 324, and may thereafter engage in packet-data communications with entities such as remote computer 326.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminals 302, 304-1, 304-2, 304-3, and 304-4 typically comprises a user-interface, I/O components, a communication interface, a tone detector, a processing unit, and data storage, all of which may be coupled together by a system bus or other mechanism. As such, system 300, ATs 302, 304-1, 304-2, 304-3, and 304-4, and air interfaces 303, 305-1, 305-2, 305-3, and 305-4 collectively are representative of example means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With the arrangement described above, an access terminal can engage in cellular voice and/or in packet-data communications. Referring again to FIG. 3, and taking an originating call from AT 302 as an example, AT 302 first sends an origination request over air interface 303 and via the BTS 306 and BSC 308 to MSC 310. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 318 by way of PCF 316. The PDSN 318 and access terminal 302 then negotiate to establish a data link layer connection, such as a point to point protocol (PPP) session. Further, the PDSN 318 sends a foreign agent advertisement that includes a challenge value to the access terminal, and the access terminal responds with a mobile-IP registration request (MIP RRQ), including a response to the challenge, which the PDSN forwards to HA 324. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, the BTS of a serving sector transmits to all its active ATs on a common forward link, using time division multiplexing (TDM) to distinguish transmissions among the recipient ATs. Each transmission is made at the full power of the sector, thereby optimizing the achievable signal-to-noise characteristics. As a result of the full-power allocation by the sector, an access terminal operating under IS-856 can, in theory, receive packet-data at a rate of at least 38.4 kbps and up to 2.4 Mbps on its forward link. The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset.

The IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT.

In operation, each AT with an active EVDO data session in a given sector encodes reverse-link traffic-channel data using the same PN long code but with an AT-specific long-code mask. Each AT also transmits its pilot signal, which consists of all zeros encoded with a PN short code of zero and further encoded using an AT-specific long-code mask. ATs having active sessions with a given serving base station (or in a given sector) can transmit concurrently, so the serving base station receives a signal that is generally the superposition of transmissions from multiple ATs. The serving base station knows the long-code mask of each served AT with an active data session, and uses the mask to sort out each AT's pilot signal in order establish and maintain that AT's timing reference. A base station's timing reference for a given AT is essentially a synchronization with the AT's chips. Once the base station establishes synchronization, it can apply the AT's long-code mask to sort out data received from that AT and decode the data on a chip-by-chip basis. The pilot is transmitted nearly continuously during every 2,048-chip timeslot, allowing the base station to continuously update its timing reference for the AT as the AT moves about in the sector, or as other factors cause the AT's operational RF conditions to change.

Operation in an IS-856 compliant communication system may be illustrated, again with reference to FIG. 3. To acquire packet data connectivity under IS-856, after an access terminal first detects an EVDO carrier, the access terminal sends to its BSC (or RNC) 308 a UATI (Universal Access Terminal Identifier) request, and receives in response an UATI, which the access terminal can then use to identify itself in subsequent communications with the BSC. The access terminal then sends a connection-request to the BSC 308, and the BSC responsively invokes a process to authenticate the access terminal and to have the access terminal acquire a data link.

In particular, the BSC 308 sends an access request to an Access Network AAA (ANAAA) server (which may be different than the AAA server 322), and the ANAAA server authenticates the access terminal. The BSC 308 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 318 (via PCF 316), and the PDSN and access terminal then negotiate to establish a PPP data link. In addition, as in the IS-2000 process, the access terminal then sends an MIP RRQ to the PDSN, which the PDSN forwards to the HA 324, and the HA assigns a mobile-IP address for the access terminal to use.

Once the access terminal has acquired an IS-856 radio link, a data link, and an IP address, the access terminal is considered to be in an active mode (or state). In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. DYNAMIC ADAPTATION OF AUXILIARY PILOT OPERATION a. Operating Principles of the Auxiliary Pilot As described above, under IS-856 the reverse link consists of an access channel and a traffic channel. The traffic channel is further subdivided into a pilot channel, a MAC channel, and ACK channel and a data channel. The MAC channel further includes a reverse rate indicator (RRI) channel and a DRC channel. The transmission power applied to each of these channels is tied (or linked) to that of the pilot channel, whose power in turn is regulated by a form of feedback loop between an access terminal and the base station. In short, an access terminal adjusts the power of its pilot signal (i.e., the gain applied to its pilot channel) in response to power-control commands received from the base station, and the base station issues power control commands to the AT according to the power received from the AT in comparison with a threshold level. The threshold level is periodically subject to adjustment based on an error rate of packets received at the base station from the access terminal. At the same time, the power applied to each of the other channels is scaled in relation to the pilot signal, such that the relative gain of each channel with respect to that of the pilot channel is kept fixed. For example, in typical operation, the reverse ACK channel is transmitted at 3 dB higher than the pilot channel (twice the pilot signal power), the RRI channel is transmitted at the same gain as the pilot channel (same power as the pilot signal), and the data channel is transmitted 3 dB lower (½ the pilot signal power). Note that using a fixed gain factor with respect to the gain of the pilot channel is equivalent to using a fixed power ratio with respect to the power of the pilot channel.

The data rate achievable on the reverse link depends on a combination of factors, including noise characteristics of the reverse link as reported to the AT by the base station, the amount of data to be sent by the AT, and the amount of reverse-link power the AT has to spare ("head room"). In turn, the data rate will be used to determine the size of the payload of link-layer packets sent from the AT to the base station. A higher achievable data rate supports higher-density coding, and hence more data symbols per frame and a correspondingly larger payload size. Conversely, a smaller data rate accommodates lower-density coding and thus a smaller payload size.

The ability of the base station to correctly decode a packet received from a given AT depends on the quality and reliability of the base station's timing reference for the AT, which, in turn, depends (at least in part) on the strength of the AT's pilot signal. In particular, as payload size grows with the data rate of an AT's reverse-link data channel, the importance of a reliable timing reference for that AT at the serving base station correspondingly increases. To help ensure the requisite reliability, Rev. A of EVDO introduced an "auxiliary pilot" signal that an AT turns on and off according to the payload size that the AT transmits on its reverse-link data channel. Specifically, in conventional operation under EVDO, Rev. A, a system-wide threshold for the size of data packet payloads is set according to a single, system-wide parameter called AuxiliaryPilotChannelMinPayload such that an access terminal will turn on its auxiliary pilot whenever the AT starts transmitting link-layer packets with payloads at least as large as the threshold. The AT will subsequently turn off its auxiliary pilot if the payload sizes of packets drops below the threshold. With the introduction of the auxiliary pilot, the nominal pilot is redesignated as the "primary pilot" signal (or channel).

When switched on, an AT's auxiliary pilot is conventionally transmitted at a fixed gain below that of the primary pilot, typically at −9 dB with respect to the gain of the primary pilot (although other values could be used). Except for the reduced power level with respect to the primary, however, the auxiliary pilot is identical the primary, being encoded with the same PN long-code mask. Thus, the primary and auxiliary pilots are effectively additive to a single pilot signal that is identical to either one of them but having their combined transmission power. From the perspective of the serving the base station, the AT appears to be transmitting a stronger pilot signal when its auxiliary pilot is switched on. In turn, the base station's timing reference for the AT is made more precise and reliable.

b. Reverse Noise Rise (RNR) and Reverse Activity Bit (RAB)

As described briefly above, under EVDO the serving BTS (or other element of the base station) for a given cell or sector (or other form of coverage area) periodically broadcasts a reverse activity bit (RAB) in order to help control noise and interference on the aggregate of the reverse links in the cell or sector. The access terminals associated with the reverse links may in turn adjust their power levels in accordance with the received RAB. More specifically, the BTS measures the reverse noise typically once per forward-link time slot (i.e., every 1.67 ms) and computes a corresponding reverse noise rise (RNR) as the difference between the current measurement of reverse noise and a baseline level of reverse noise. The computed RNR is then compared with a threshold, and the RAB is set according to whether or not the threshold value is exceeded, wherein a bit value of one (RAB-set) corresponds to the RNR exceeding the threshold and a bit value of zero (RAB-clear) corresponds to the RNR not exceeding the threshold. The BTS then broadcasts the RAB for each computation of RNR and threshold comparison. Note that the RNR computation may be used for other purposes as well, besides setting the RAB.

The base station typically determines the baseline noise level using what is termed a silent interval, which occurs periodically (e.g., once every five minutes), and lasts on the order of 40-100 ms. Both the period and the duration of the silent interval are generally configurable. During the silent interval, access terminals refrain from transmitting anything to the BTS. As a result, any power received by the BTS during the silent interval may be characterized as noise. As such, the baseline corresponds to the amount of reverse noise when the cell or sector is unloaded (i.e., without any transmitting access terminals). Note that other reverse-link-noise levels could be used as a baseline, instead of or in addition to the unloaded-sector level.

In general, the lower the RNR is at a given time, the more favorable the RF conditions are for communication between access terminals and the base station at that time. Conversely, the higher the RNR, the less favorable are the RF conditions. Also, a low RNR generally corresponds to a cell or sector being lightly loaded (i.e., the sector is supporting communications for a relatively low number of access terminals). On the other hand, a high RNR generally corresponds to a sector being heavily loaded (i.e., the sector is supporting communications for a relatively high number of access terminals). The threshold RNR value used in setting or clearing the RAB is generally configurable within a range of 0-30 dB, with a typical value being 5 dB in a wireless communication system operating under IS-856.

The RAB is broadcast by the base station on a "reverse activity channel," which is a sub-channel of the forward-link MAC channel. Each access terminal having an EVDO reverse link to the base station will receive the same RAB value (set or clear) on the forward link, and will respond accordingly. As described above, upon receiving a RAB-set broadcast, an AT, according to conventional EVDO operation, will reduce its T2P power, typically by half. Upon receiving a RAB-clear broadcast, an AT will leave its T2P power unchanged (or possibly increase it). Since each AT with a reverse link to the base station contributes to the reverse noise, and hence to the RNR, causing them to reduce their transmission power (i.e., responsive to receiving a RAB-set broadcast) results in reduced reverse noise. However, the benefit of reducing the RNR may come at a cost of reduced overall data throughput, since by reducing T2P power, some or all of the ATs may also have to reduce their transmitted data rate.

c. Dynamic Adaptation of Auxiliary Pilot Operation According to Reverse Noise

While use of a threshold packet size to determine whether or not an AT should switch its auxiliary pilot on or off can help ensure reliable decoding of data by the base station, it does not fully or even necessarily accurately account for the immediate RF conditions under which the AT is operating. For example, in conventional EVDO, Rev. A operation a given access terminal transmitting data packets with payloads larger than AuxiliaryPilotChannelMinPayload will use its auxiliary pilot, even if the given AT is close enough to its serving BTS to render the auxiliary pilot unneeded. In such a case, the auxiliary pilot will contribute unnecessarily to the reverse noise. Moreover, there could be more than one such AT, and possibly several, served by the same particular BTS that each contribute unnecessary auxiliary pilot power to the reverse noise. At the same time, there could of course be one or more other ATs whose auxiliary pilot use is needed to support reliable decoding by the base station.

If at some point, the particular BTS (or more generally, base station) computes an RNR value that exceeds the RNR threshold, it will broadcast a RAB set to one. Under conventional EVDO operation, this will signal the served ATs to reduce their respective T2P power ratios. As a consequence, some number of the ATs (possibly a majority of them) will also reduce their data transmission rates if their new (reduced) T2P powers do not support the data rates the ATs had been achieving at their higher (pre-reduced) T2P power ratios. Yet, it may be the case that the power from auxiliary pilots contributes sufficiently to the RNR such that elimination of this contribution would reduce RNR below the RNR threshold. In view of the possibility described above that some ATs are using their auxiliary pilots unnecessarily, disabling auxiliary pilot use among the ATs served by the particular BTS as a first response to a RAB-set broadcast may therefore achieve the requisite RNR reduction while at the same time impacting only minimally on the data rate of individual ATs as well as on the overall system throughput. Accordingly, embodiments of the present invention cause an access terminal to adapt operation of it auxiliary pilot in response to receiving one or another form of noise-level indication from its serving base station. In particular an access terminal will disable it auxiliary pilot in response to receiving a message containing an indication that the reverse noise has exceeded some threshold value. At the same time, the AT will not reduce its T2P power in response to the noise-level indication.

In accordance with an example embodiment, an access terminal engaging in an active EVDO communication session, in a first state in which the AT switches its auxiliary pilot on and off according to comparison of the payload sizes of transmitted packets to a threshold payload size, will respond to reception of a noise-level message from the serving base station (or BTS, for example) carrying an indicator of high RNR by disabling operation of its auxiliary pilot. The message could be a RAB-set broadcast, in which case the criteria for "high" RNR would be the base station's determination according the RNR threshold maintained by the base station. Note that in practice, the base station's RNR threshold usually corresponds to the value of a system-wide parameter, wherein a single value is used for multiple BTSs, and possibly for the entire system. As an alternative to a RAB-set broadcast, the noise-level message could contain the actual RNR value and the AT could compare the received RNR value to a local RNR threshold stored in the AT (e.g., in physical memory).

Using a RAB-set broadcast to cause an AT to disable operation of its auxiliary pilot would facilitate implementation of the new method without introducing any new or altered messages beyond those already employed in an EVDO system. Base station operation with respect to measuring reverse noise, computing RNR, and broadcasting the RAB could be carried out according to conventional operation. The access terminal would control operation of its auxiliary pilot according to the value of the RAB received from the base station. To the extent that a RAB-set broadcast signifies a problematic reverse noise level, disabling auxiliary pilot operation in response to a RAB-set broadcast can be view as a reactive mode of mitigating excessive RNR.

The alternative noise-level message, in which the actual RNR value is broadcast, would likely introduce a new or modified forward-link system or control message. For instance, additional bits in the forward MAC channel might be allocated for this purpose. Furthermore, the AT would respond to each received RNR value (e.g., in a noise-level message) by consulting a stored value of RNR threshold for comparison with the received RNR value. If the received value is determined to exceed the stored threshold, then the AT would disable operation of its auxiliary pilot (if it hadn't already been disabled). Using the RNR value to cause an AT to disable operation of its auxiliary pilot would allow different access terminals to disable operation of their auxiliary pilots according to different RNR thresholds, making each AT's RNR threshold a form of service differentiator among ATs. Moreover, by configuring all or some of the ATs' RNR thresholds below the conventional RAN-based RNR threshold used in setting the value of the RAB, auxiliary pilot operation can be disabled before the RNR is deemed excessive by the RAN. In this way, excessive RNR could be preempted through proactive disabling of auxiliary pilots—i.e., prior to the RNR exceeding the system's RNR threshold.

In further accordance with the example embodiment, disabling auxiliary operation could comprise the AT transitioning from the first state to a second state in which operation of the AT's auxiliary pilot is disabled in one way or another. The specific manner in which the AT disables operation of its auxiliary pilot could take on various modes of what is considered herein more generally as adapting auxiliary pilot operation to help achieve reduced reverse noise. One approach would be to increase the threshold packet size sufficiently so as to eliminate or at least significantly reduce the likelihood of conventional triggering of the auxiliary pilot. Another approach would be to unconditionally turn off the auxiliary pilot, regardless of the payload sizes of packets transmitted by the access terminal. In either approach, the actions to disable auxiliary pilot operation could be taken either while the AT is already transmitting the auxiliary pilot, in which case the auxiliary pilot transmission would be switched off, or prior to the AT switching on its auxiliary pilot, in which case the auxiliary pilot would remain off even if the AT begins transmitting packets with payloads larger than the threshold payload size.

More specifically, to disable auxiliary pilot operation by increasing the threshold payload size, the AT could maintain a table of threshold values arranged from a minimum to a maximum value, for instance. Upon determining that its auxiliary pilot should be disabled (i.e., responsive to receiving an appropriate noise-level message), the AT could select a threshold value from the table, the value being large enough to ensure that the conventional payload-threshold triggering condition of the auxiliary pilot is either not met or unlikely to be met. For example, the system parameter AuxiliaryPilotChannelMinPayload that designates the threshold payload size used in conventional EVDO operation described above is typically specified to be one of the values in the list {128, 256, 512, 768, 1,024, 1,536, 2,048, 3,072, 4,096, 6,144, 8,192, 12,288}, in units of bits. The AT could maintain such a table in its memory, and the AT could update its current threshold value by selecting a larger value from the table.

Continuing with the present example, if the AT's current threshold is 1,536 bits and the AT is currently transmitting packets having payloads of 2,048 bits in size, then the AT's auxiliary pilot would be on, in accordance with conventional EVDO operation. Upon determining that its auxiliary pilot should be disabled, e.g., in response to a RAB-set broadcast, the AT could select a new threshold value of 3,072 (or larger) from the table. This would render the payload sizes of transmitted packet smaller than the threshold, and the auxiliary pilot would be shut off. Note that if the AT later started transmitting packets larger than 3,072 bits, the pilot would again turn on. Thus, increasing the threshold size in this manner might not exclude use of the auxiliary pilot, but only inhibit its use. In this sense, the AT could return to operating in the first state if it begins transmitting large enough packets. The larger the threshold selected from the table, the stronger the inhibition of auxiliary pilot use. By having a maximum allowed size, disabling operation of the auxiliary pilot is not entirely ruled out, however.

Even if the AT is transmitting packets with payloads smaller than the current threshold size when it receives a RAB-set broadcast (or other indicator of excessive RNR), the AT could nevertheless increase it current threshold size in order to make future auxiliary pilot use unlikely. For instance, the AT could select a threshold payload size from its stored table that is twice as large as the payloads of packets the AT is currently transmitting. In this way, access terminals in a cell or sector for which excess RNR has been determined by the BTS would be inhibited from using their auxiliary pilots, and would therefore be prevented from adding reverse noise on an already "noisy" reverse links. Again, by providing a maximum threshold value, the triggering of the auxiliary pilot for sufficiently large packet payloads would still be possible.

As noted, an alternative approach to disabling operation of the auxiliary pilot would be to cease transmission of the auxiliary pilot regardless of packet payload sizes. Following this approach, an AT that is transmitting its auxiliary pilot would cease auxiliary pilot transmission upon receiving an appropriate noise-level message (e.g., a RAB-set broadcast) from the base station. An AT that receives a noise-level message but is not transmitting its auxiliary pilot would simply ignore any conventional payload-size trigger that might thereafter occur.

For either approach of disabling, the AT could re-enable auxiliary pilot operation upon receiving an updated noise-level message indicating that reverse noise is no longer excessive. Such an updated noise-level message could include a RAB-clear broadcast from the base station, for instance. Alternatively, the AT may determine that an RNR value broadcast by the base station does not exceed the AT's specific RNR threshold. In response to either form of updated noise-level message (or some other form of noise-level message indicating non-excessive reverse noise), the AT would re-enable its auxiliary pilot. For example, if the AT disabled its auxiliary pilot by increasing its payload-size threshold, then the AT could re-enable its auxiliary pilot by reducing the threshold back to its previous value (i.e., its value prior to the disabling actions). If the AT disabled its pilot by ignoring the conventional payload-size trigger, the AT could again begin responding to the trigger. In re-enabling operation of its auxiliary pilot, the AT would also be transitioning back to the first state, described above.

Re-enabling operation of the auxiliary pilot advantageously ensures that prevention of auxiliary pilot operation for the purposes of mitigating excessive reverse-link noise is only a temporary measure. Once the problematic RNR is corrected, conventional auxiliary pilot operation may resume. Of course, since the reverse noise level is dynamic, there could be repeated cycles of disabling and re-enabling auxiliary pilot operation among ATs in a given cell or sector. In order to avoid overly-rapid cycling between disabling and re-enabling auxiliary pilot operation, the AT could respond to sequences of noise-level messages instead of to each individual message. For example, the AT operating in the first state could determine a time-average of RAB broadcasts, and decide whether or not to transition to the second state (disabling auxiliary pilot operation) based on the computed average. Similarly, the AT could decide whether or not to transition from the second state to the first state based a subsequently computed time average of RAB broadcasts. Other forms of tracking of noise-level messages could be used, as could other forms of decision criteria (e.g., time averaged RNR values, etc.).

Disabling auxiliary pilot operation in response to excessive RNR advantageously provides measures for mitigating reverse-link noise without necessarily decreasing data transmission rates of individual AT or reducing overall data throughput in a wireless communication system. In the event that this corrective action does not achieve a requisite reduction of reverse-link noise or otherwise sufficiently reduce the RNR, the base station of a given cell or sector will continue to broadcast noise-level messages informing the ATs in the cell or sector that the RNR problem persists. The ATs may then respond in accordance with conventional operation by reducing their reverse-link power (e.g., T2P power ratios) and re-enabling auxiliary pilot operation. Although re-enabling auxiliary pilot operation might lend itself to further increasing reverse noise, the lower T2P power will tend to reduce the ATs' achievable data rates and in turn tend to decrease payload sizes and hence the likelihood that auxiliary pilots would be triggered in any case. In this way, the system may assure that reverse-link noise may be controlled through graduated steps aimed at maintaining data rates of individual ATs and of the entire system.

4. IMPLEMENTATION OF EXAMPLE EMBODIMENT

The example embodiment described above can be implemented as a method carried out on an access terminal or other communication device that operates according to EVDO, Rev. A in a similarly-compliant wireless communication system such as the one described above in connection with FIG. 2. The logical steps and operations of the method are described in the next subsection. Example means for carrying out the method are described in the subsequent subsection.

a. Example Method Implementation

Figure 4:
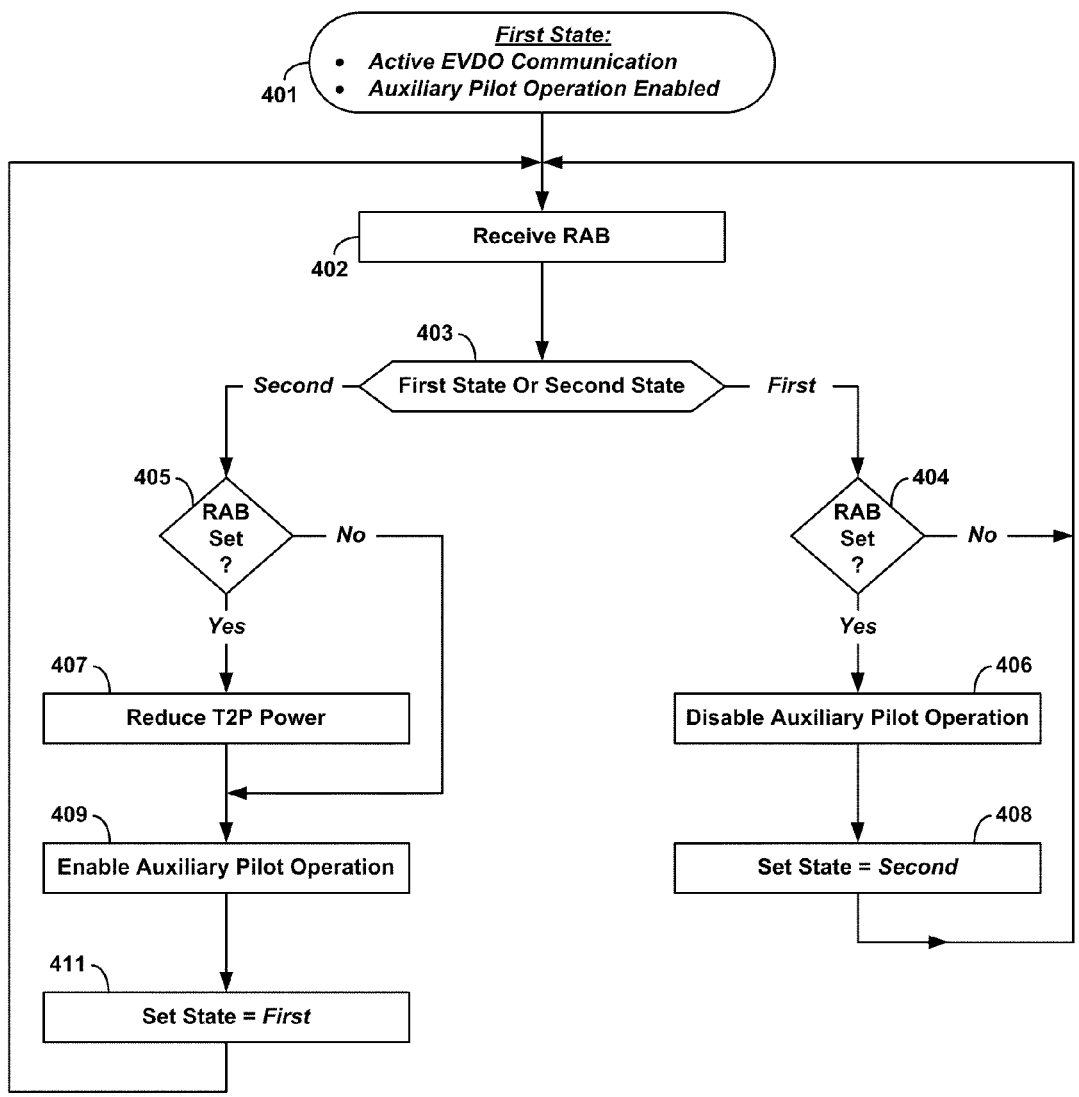
FIG. 4 illustrates an example embodiment of logical steps for implementing a method of dynamic adaptation of auxiliary pilot operation in response to reverse-link noise.

An implementation of the example embodiment illustrated in the form of a logical flowchart is shown in FIG. 4. As such, the illustrated steps could be implemented in an access terminal (or similar device) as executable instructions stored in the memory of the AT and executed by one or more processors of the AT.

At the start 401, the AT is operating in a first state in which it is engaged in an active EVDO communication session via a BTS (or base station), and in which the AT's auxiliary pilot is enabled. As such, the access terminal turns its auxiliary pilot on or off according to whether or not it is transmitting data packets with payloads exceeding AuxiliaryPilotChannelMinPayload, in a manner as described above.

At step 402, the AT receives a noise-level message from the base station. By way of example, this message is taken to be a RAB broadcast. It will be appreciated that another form of message could be used, such as one carrying an actual RNR value. The AT's response to the received message depends both on the value of the RAB and on the operational state of the AT. One of two different branches of execution is taken depending on the state, as indicated at step 403. If the AT is in the first state, then execution proceeds according to a first branch to step 404, where a determination is made as to whether the RAB is set or clear (i.e., one or zero). If the RAB is not set ("No" branch from step 404), then execution returns back to step 402, where the AT waits for and receives the next RAB from the base station. In this case, RNR is deemed not to be excessive, so the AT continues operating in the first state.

If the RAB is set ("Yes" branch from step 404), the AT disables operation of its auxiliary pilot (step 406), transitions to the second state (step 408), then returns to step 402. In this case, RNR is deemed excessive, and the AT disables operation of its auxiliary pilot so as to reduce its contribution to reverse noise. Disabling auxiliary pilot operation could correspond to one or more of the specific modes described above. Namely, adjustment of a locally-stored value of AuxiliaryPilotChannelMinPayload, or ceasing auxiliary pilot operation regardless of packet payload size. In the present example embodiment, transitioning to the second state comprises both the disabling step (406) and setting a status indicator to "Second" as represented at step 408. There could be other actions associated with the transition as well.

If the AT is in the second state when it receives the RAB at step 402, then execution proceeds from step 403 to step 405. At step 405, the AT determines if the RAB is set or clear (as in step 404). If the RAB is set ("Yes" branch from step 405), the AT reduces its T2P power (step 407), enables its auxiliary pilot (step 409), transitions to the first state (step 411), then returns to step 402. In this case, auxiliary pilot operation was previously disabled (i.e., the AT is in the second state), so the RAB being set indicates that further reverse noise reduction is needed. Thus, the AT reduces its T2P power and returns to operating in the first state.

If the RAB is not set ("No" branch from step 405), the AT re-enables its auxiliary pilot (step 409) but does not reduce its T2P power. The AT then transitions back to the first state (step 411) and returns to await the next RAB (at step 402). In this case, auxiliary pilot operation was previously disabled (i.e., the AT is in the second state), so the RAB being clear indicates that no further reverse noise reduction is needed. Thus, the AT returns to operating in the first state without having to reduce its T2P power. This case corresponds to successful mitigation of excessive RNR through disabling auxiliary pilot operation only. That is, no other reverse-link power reduction is needed, and the AT can advantageously maintain its current T2P power under conditions that would other require such a reduction according to conventional operation.

It will be appreciated that the steps shown in FIG. 4 are meant to illustrate operation of example embodiments. As such, various steps could be altered or modified, and the ordering of certain steps could be changed, while still achieving the overall desired operation. For example, if an RNR value is broadcast, the step 402 might comprise further steps of determining whether or not the AT's locally-stored RNR threshold was exceeded. Further, steps 404 and 405 could comprise more involved actions that determine whether time averages of received RAB values exceed one or another threshold. As noted above, such an approach could help avoid overly-rapid cycling between the first and second states. Finally, disabling and enabling auxiliary pilot operation could take on various forms, as discussed above. As such, each of steps 406 and 409 could comprise additional actions.

b. Example Access Terminal

Figure 5:
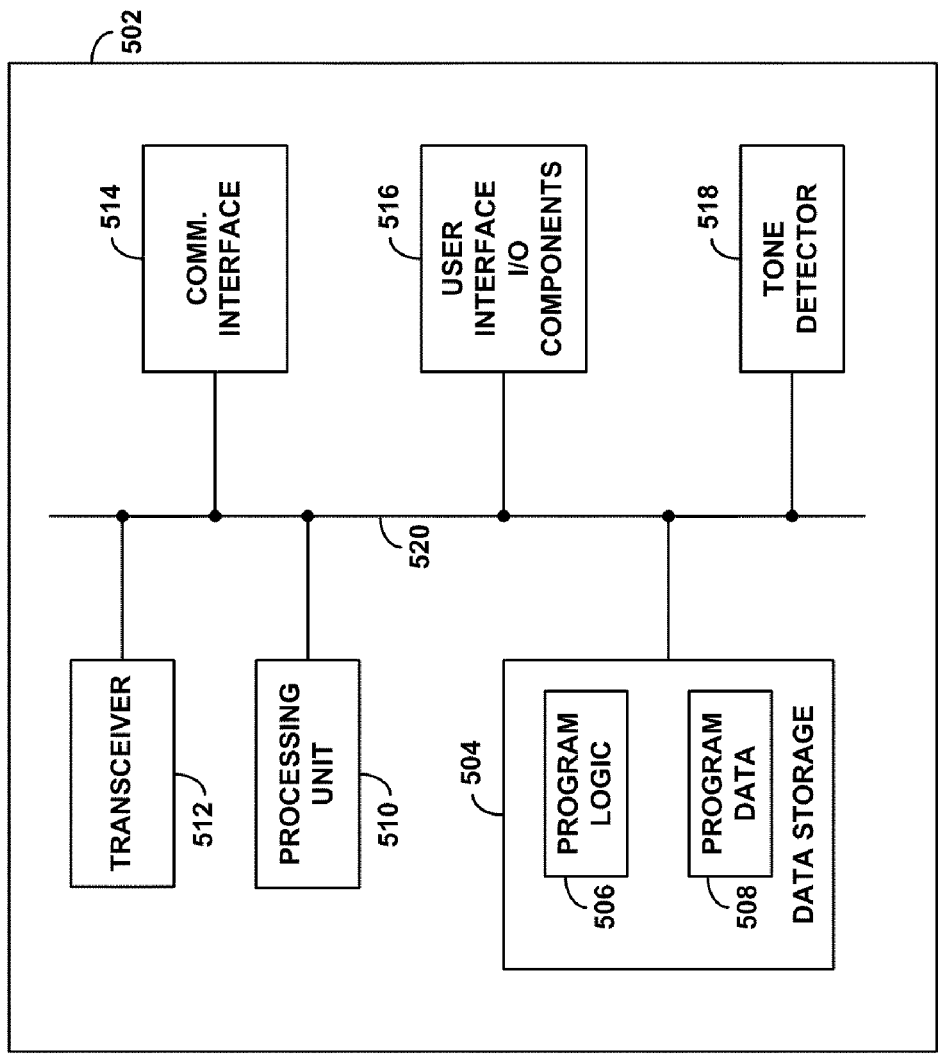
FIG. 5 is a block diagram of an example access terminal in which dynamic adaptation of auxiliary pilot operation in response to reverse-link noise may be implemented.

FIG. 5 is a simplified block diagram depicting functional components of an example access terminal 502 in which dynamic adaptation of auxiliary pilot operation in response to reverse-link noise may be implemented. The example AT 502 could be a cell phone, a personal digital assistant (PDA), a pager, a wired or wirelessly-equipped notebook computer, or any other sort of device. As shown in FIG. 5, the example AT 502 includes data storage 504, processing unit 510, transceiver 512, communication interface 514, user-interface I/O components 516, and tone detector 518, all of which may be coupled together by a system bus 520 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 502 relevant to triggering a variable auxiliary pilot are discussed briefly below.

Communication interface 514 in combination with transceiver 512, which may include one or more antennas, enables communication with the network, including reception of noise-level messages (e.g., RAB broadcasts) from the serving base station and transmission of both the primary and auxiliary pilots, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 510 comprises one or more general-purpose processors (e.g., INTEL microprocessors) and/or one or more special-purpose processors (e.g., dedicated digital signal processor, application specific integrated circuit, etc.). In turn, the data storage 504 comprises one or more volatile and/or non-volatile storage components, such as magnetic or optical memory or disk storage. Data storage 504 can be integrated in whole or in part with processing unit 510, as cache memory or registers for instance. In example AT 502, as shown, data storage 504 is configured to hold both program logic 506 and program data 508.

Program logic 506 may comprise machine language instructions that define routines executable by processing unit 510 to carry out various functions described herein. In particular the program logic, communication interface, and transceiver may operate cooperatively to carry out logical operation such as that discussed above and illustrated in FIG. 4. Further, program data 508 may be arranged to store a local RNR threshold and/or a table of AuxiliaryPilotChannelMinPayload values maintained in conjunction with the logical operations described above. Program data 508 could also comprise storage for one or another form of time averages of RAB or RNR values, also discussed above.

It will be appreciated that there can be numerous specific implementations of dynamic adjustment of threshold payload size for triggering an auxiliary pilot in an access terminal, such AT 502 illustrated in FIG. 5. Further, one of skill in the art would understand how to devise and build such an implementation. As such, AT 502 is representative of means for carrying out the method of triggering operation of a variable auxiliary pilot in accordance with the methods and steps described herein by way of example.

5. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal operating in a wireless communication system that includes a base station, a method comprising:

operating in a first state in which the access terminal transmits a primary beacon signal on an air interface communication link to the base station, and also transmits a secondary beacon signal on the air interface communication link to the base station concurrently with transmission of the primary beacon signal; and while operating in the first state, responsive at least to receiving a noise-level message from the base station, the noise-level message carrying an indication of a measurement by the base station of aggregate transmission noise received at the base station from a plurality of access terminals including the access terminal, transitioning to a second state in which the access terminal ceases to transmit the secondary beacon signal and continues to transmit the primary beacon signal, wherein operating in the first state comprises transmitting data packets having sizes larger than a threshold packet size, and wherein transitioning to the second state comprises ceasing to transmit the secondary beacon signal and continuing transmitting data packets having sizes larger than a threshold packet size.

2. The method of claim 1, wherein the primary beacon signal is used by the base station to maintain a common timing reference between the access terminal and the base station, the common timing reference facilitating decoding by the base station of other signals received from the access terminal, and wherein the secondary beacon signal is used by the base station to enhance reliability of the common timing reference.

3. The method of claim 1, wherein the access terminal and the wireless communication system both operate at least according to IS-856, and wherein the primary beacon signal is a primary pilot signal and the secondary beacon signal is an auxiliary pilot signal.

4. The method of claim 1,
wherein transitioning to the second state further comprises:
while operating in the first state, responsive to receiving the noise-level message, increasing the threshold packet size beyond the sizes of the data packets; and
making a first determination that the access terminal is not transmitting data packets having sizes larger than the increased threshold packet size,
and wherein ceasing to transmit the secondary beacon signal comprises ceasing to transmit the secondary beacon signal in response to making the first determination.

5. The method of claim 4, wherein the access terminal and the wireless communication system both operate according to a CDMA family of protocols including IS-856,
wherein the threshold packet size corresponds to a value of AuxiliaryPilotChannelMinPayload,
wherein increasing the threshold packet size comprises increasing the value of AuxiliaryPilotChannelMinPayload, the increased value of AuxiliaryPilotChannelMinPayload not exceeding a maximum allowed value,
and wherein making the first determination that the access terminal is not transmitting data packets having sizes larger than the increased threshold packet size comprises determining that the access terminal is not transmitting data packets having payload sizes larger than the increased value of AuxiliaryPilotChannelMinPayload.

6. The method of claim 1, wherein the access terminal and the wireless communication system both operate according to a CDMA family of protocols including IS-856,
wherein the threshold packet size corresponds to a value of AuxiliaryPilotChannelMinPayload,
and wherein transmitting data packets having sizes larger than a threshold packet size comprises transmitting data packets having payload sizes larger than the value of AuxiliaryPilotChannelMinPayload.

7. The method of claim 4, further comprising:
while operating in the second state, responsive at least to making a second determination that the access terminal is transmitting data packets having sizes larger than the a current value threshold packet size, transitioning to the first state,
wherein the current value is the value of threshold packet size when the second determination is made.

8. The method of claim 1 further comprising:
while operating in the second state, responsive at least to receiving an updated noise-level message from the base station, transitioning to the first state.

9. The method of claim 1, wherein the access terminal and the wireless communication system both operate according to a CDMA family of protocols including IS-856,
and wherein receiving the noise-level message from the base station comprises receiving a reverse activity bit (RAB) that is set to indicate that the base station has measured a reverse noise rise (RNR) that exceeds an RNR threshold value maintained by the base station.

10. The method of claim 9, wherein operating in the first state further comprises transmitting with a current traffic-to-pilot (T2P) power ratio,
and wherein transitioning to the second state further comprises ceasing to transmit the secondary beacon signal and not reducing the current T2P power ratio.

11. The method of claim 10 further comprising:
while operating in the second state, responsive to receiving a RAB that is set to indicate that the base station has measured an RNR that exceeds an RNR threshold value maintained by the base station, reducing the current T2P power ratio.

12. The method of claim 1, wherein the access terminal and the wireless communication system both operate according to a CDMA family of protocols including IS-856,
wherein receiving the noise-level message from the base station comprises receiving a message including a reverse noise rise (RNR) measurement from the base station,
and wherein transitioning to the second state further comprises ceasing to transmit the secondary beacon signal responsive to determining that the RNR measurement exceeds an RNR threshold value maintained by the access terminal.

13. In an access terminal operating in a wireless communication system that includes a base station, a method comprising:
operating in a first state in which (i) the access terminal transmits a primary beacon signal on an air interface communication link to the base station, and, (ii) upon occurrence of a first condition of the access terminal transmitting data packets having sizes larger than a threshold packet size, the access terminal activates and transmits a secondary beacon signal on the air interface communication link to the base station concurrently with transmission of the primary beacon signal; and
while operating in the first state, responsive to receiving a noise-level message from the base station, the noise-level message carrying an indication of a measurement by the base station of aggregate transmission noise received at the base station from a plurality of access terminals including the access terminal, disabling transmission of the secondary beacon signal,
wherein the access terminal and the wireless communication system both operate according to a CDMA family of protocols including IS-856,
and wherein receiving the noise-level message from the base station comprises receiving a reverse activity bit (RAB) that is set to indicate that the base station has measured a reverse noise rise (RNR) that exceeds an RNR threshold value maintained by the base station.

14. The method of claim 13, wherein the primary beacon signal is a primary pilot signal and the secondary beacon signal is an auxiliary pilot signal.

15. The method of claim 13, wherein operating in the first state comprises transmitting the secondary beacon signal after the first condition has occurred,
and wherein disabling transmission of the secondary beacon signal comprises thereafter transitioning to a second state in which the access terminal ceases to transmit the secondary beacon signal and continues to transmit the primary beacon signal.

16. The method of claim 13, wherein disabling transmission of the secondary beacon signal comprises:
prior to occurrence of the first condition, transitioning to a second state in which the access terminal does not activate and does not transmit the secondary beacon signal upon occurrence of the first condition, and continues to transmit the primary beacon signal.

17. The method of claim 13, wherein operating in the first state further comprises:
subsequent to activating and transmitting the secondary beacon signal, turning off the secondary beacon signal upon occurrence of a second condition of the access terminal transmitting data packets having sizes no larger than the threshold packet size,
and wherein disabling transmission of the secondary beacon signal comprises:
inhibiting transmission of the secondary beacon signal by increasing the threshold packet size.

18. The method of claim 17, wherein
the threshold packet size corresponds to a value of AuxiliaryPilotChannelMinPayload,
wherein transmitting data packets having sizes larger than the threshold packet size comprises transmitting data packets having payload sizes larger than the value of AuxiliaryPilotChannelMinPayload,
wherein increasing the threshold packet size comprises increasing the value of AuxiliaryPilotChannelMinPayload, the increased value of AuxiliaryPilotChannelMinPayload not exceeding a maximum allowed value,
and wherein transmitting data packet having sizes no larger than the threshold packet size comprises transmitting data packets having payload sizes no larger than the value of AuxiliaryPilotChannelMinPayload.

19. The method of claim 13, further comprising: while operating in the first state, responsive at least to receiving an updated noise-level message from the base station, re-enabling transmission of the secondary pilot signal.

20. The method of claim 13, wherein operating in the first state comprises transmitting with a current traffic-to-pilot (T2P) power ratio,
wherein disabling transmission of the secondary pilot signal comprises disabling transmission of the secondary pilot signal while not reducing the current T2P power ratio,
and wherein the method further comprises:
responsive to receiving a RAB subsequent to disabling the secondary pilot signal, the RAB being set to indicate that the base station has measured an RNR that exceeds an RNR threshold value maintained by the base station, reducing the current T2P power ratio.

21. The method of claim 13, wherein
disabling transmission of the secondary beacon signal comprises disabling transmission of the secondary beacon signal responsive to determining that the measured RNR exceeds the RNR threshold value maintained by the access terminal.

22. An access terminal configured for operating in wireless communication system, the access terminal comprising:
means for operating in a first state in which (i) the access terminal transmits a primary beacon signal on an air interface communication link to a base station, and, (ii) upon occurrence of a first condition of the access terminal transmitting data packets having sizes larger than a threshold packet size, the access terminal activates and transmits a secondary beacon signal on the air interface communication link to the base station concurrently with transmission of the primary beacon signal;
means for receiving a noise-level message from the base station while operating in the first state, the noise-level message carrying an indication of a measurement by the base station of aggregate transmission noise received at the base station from a plurality of access terminals including the access terminal; and
means for disabling transmission of the secondary beacon signal in response to receiving the noise-level message,
wherein the access terminal is configured for operating in the wireless communication system at least according to IS-856,
and wherein means for receiving the noise-level message from the base station comprise means for receiving a reverse activity bit (RAB) that is set to indicate that the base station has measured a reverse noise rise (RNR) that exceeds an RNR threshold value maintained by the base station.

23. The access terminal of claim 22, wherein wherein the primary beacon signal is a primary pilot signal and the secondary beacon signal is an auxiliary pilot signal.

24. The access terminal of claim 22, wherein means operating in the first state comprise means for transmitting the secondary beacon signal after the first condition has occurred,
and wherein means for disabling transmission of the secondary beacon signal comprise means for thereafter transitioning to a second state in which the access terminal ceases to transmit the secondary beacon signal and continues to transmit the primary beacon signal.

25. The access terminal of claim 22, wherein means for disabling transmission of the secondary beacon signal comprise:
means for transitioning, prior to occurrence of the first condition, to a second state in which the access terminal does not activate and does not transmit the secondary beacon signal upon occurrence of the first condition, and continues to transmit the primary beacon signal.

26. The access terminal of claim 22, wherein means for operating in the first state further comprise:
means for turning off the secondary beacon signal upon occurrence of a second condition of the access terminal transmitting data packets having sizes no larger than the threshold packet size, subsequent to activating and transmitting the secondary beacon signal,
and wherein means for disabling transmission of the secondary beacon signal comprise:
means for inhibiting transmission of the secondary beacon signal by increasing the threshold packet size.

27. The access terminal of claim 26, wherein
the threshold packet size corresponds to a value of AuxiliaryPilotChannelMinPayload,
wherein transmitting data packets having sizes larger than the threshold packet size comprises transmitting data packets having payload sizes larger than the value of AuxiliaryPilotChannelMinPayload,
wherein increasing the threshold packet size comprises increasing the value of AuxiliaryPilotChannelMinPayload, the increased value of AuxiliaryPilotChannelMinPayload not exceeding a maximum allowed value,
and wherein transmitting data packet having sizes no larger than the threshold packet size comprises transmitting data packets having payload sizes no larger than the value of AuxiliaryPilotChannelMinPayload.

28. The access terminal of claim 22, wherein means for operating in the first state further comprise means for re-enabling transmission of the secondary pilot signal in response to at least receiving an updated noise-level message from the base station.

29. The access terminal of claim 22, wherein means for operating in the first state comprise means for transmitting with a current traffic-to-pilot (T2P) power ratio,
wherein means disabling transmission of the secondary pilot signal comprise means for disabling transmission of the secondary pilot signal while not reducing the current T2P power ratio,
and wherein the access terminal further comprises:
means for reducing the current T2P power ratio responsive to receiving a RAB subsequent to disabling the secondary pilot signal, the RAB being set to indicate that the base station has measured an RNR that exceeds an RNR threshold value maintained by the base station.

30. The access terminal of claim 22, wherein
wherein means for disabling transmission of the secondary beacon signal comprise means for disabling transmission of the secondary beacon signal responsive to determining that the measured RNR exceeds the RNR threshold value maintained by the access terminal.

* * * * *